Feb. 7, 1967    W. L. HULSLANDER ETAL    3,302,493
TAPPING T TOOL HAVING PENETRATING END WITH THREADED BORE
Filed June 1, 1964    3 Sheets-Sheet 1

INVENTORS.
WILLIAM L. HULSLANDER
CHARLES GLOVER
ROBERT N. PATERSON
BY

ATTORNEY.

INVENTORS.
WILLIAM L. HULSLANDER
CHARLES GLOVER
ROBERT N. PATERSON
BY

ATTORNEY.

INVENTORS.
WILLIAM L. HULSLANDER
CHARLES GLOVER
ROBERT N. PATERSON

BY

ATTORNEY.

United States Patent Office 3,302,493
Patented Feb. 7, 1967

3,302,493
TAPPING T TOOL HAVING PENETRATING END WITH THREADED BORE
William L. Hulslander, Charles Glover, and Robert N. Paterson, all of Bradford, Pa., assignors to Dresser Industries, Inc., Dallas, Tex., a corporation of Delaware
Filed June 1, 1964, Ser. No. 371,626
7 Claims. (Cl. 77—42)

The present invention relates to tapping T's and is concerned primarily with the penetrating tool which is an essential element of such a T.

A tapping T of the type with which this invention is concerned is ordinarily utilized in conjunction with a steel gas main. It comprises a T body that is mounted on the main in any approved manner such as by welding and has a vertical passageway or bore extending therethrough. Communicating with this bore is a lateral passage or house outlet. This lateral outlet in effect divides the bore into two portions. A penetrating tool having a body portion of maximum diameter is threadedly mounted in the upper portion of the bore and has a reduced penetrating end portion which passes through the lower portion of the bore to engage and penetrate the main. After penetration, the tool is adapted to be retracted to leave the house outlet open and remain in the upper portion of the bore where it functions as a closure. The primary objective of the present invention is to provide a new and improved penetrating tool.

The gas industry now recognizes that it is extremely desirable to cut a slug or coupon from the main in contrast to chips or shavings which would inevitably fall into the main. Moreover, this invention is founded on the basic concept of achieving the desideratum of retaining the slug or coupon in the tool so that it is withdrawn from the main as the tool is retracted.

In the co-pending application of William L. Hulslander, Serial No. 237,874, filed November 15, 1962 and entitled "Lubricated Tapping T," and now Patent No. 3,142,205, there is disclosed a penetrating tool having certain features which are designed to achieve the retention of the slug in the tool. Thus, the tool of said co-pending application has a reduced hollow penetrating end of non-circular shape and which is made of a material having the property of yieldability whereby the non-circular end portion is susceptible of permanent deformation during the cutting operation. This penetrating end portion is also tapered externally toward the cutting edge and a lubricating system is provided which comprises the socket which defines the hollow end and a radial passage spaced from the cutting edge.

An important object of the present invention is to provide in a tapping T of the type noted a tool particularly intended for penetrating steel pipe and including a hollow penetrating end portion, the bore of which is formed with means for cutting a thread on the slug or coupon so that the slug is actually screwed or threaded into the socket as an incident to the rotary cutting operation. While this thread-cutting means may take any of several forms, the invention has particularly in mind the use of at least one protuberance on the socket wall that extends radially inwardly.

Still another object of the invention is to provide a penetrating tool of the character aforesaid in which the pitch of the threads in the socket is properly co-related to the pitch of the external threads on the tool body which advances the tool during the cutting operation. As the slug is cut, it is cold-worked and will acquire a length greater than the thickness of the main from which it is cut. The thread cutting protuberance aforesaid particularly accommodates this so-called increased thickness by forming a thread of variable pitch. This variable pitch is also of importance to provide a smaller pitch as compared to the feed threads.

Still another object of the invention is to provide a tool of the type noted having a hollow penetrating end portion with a cutting edge of novel design and it affords an improved cutting action. This cutting edge is of a wave-like formation comprising a plurality of raised curves joined by bottom bends.

More in detail, the invention has as an object the provision of a tool of the type indicated including a cutting edge defined by four notches 90° apart with a raised curve extending between each pair of such notches.

Various other more detailed objectives and advantages of the invention such as arise in connection with carrying out the above noted ideas in a practical embodiment will in part become apparent and in part be hereinafter stated as a description of the invention proceeds.

The invention therefore comprises a tapping T including a penetrating tool having a threaded main body and a reduced tapered hollow penetrating end portion having a thread cutting protuberance extending into the bore and a new and improved cutting edge.

For a full and more complete understanding of the invention reference may be had to the following description and accompanying drawings, wherein.

Figure 1:
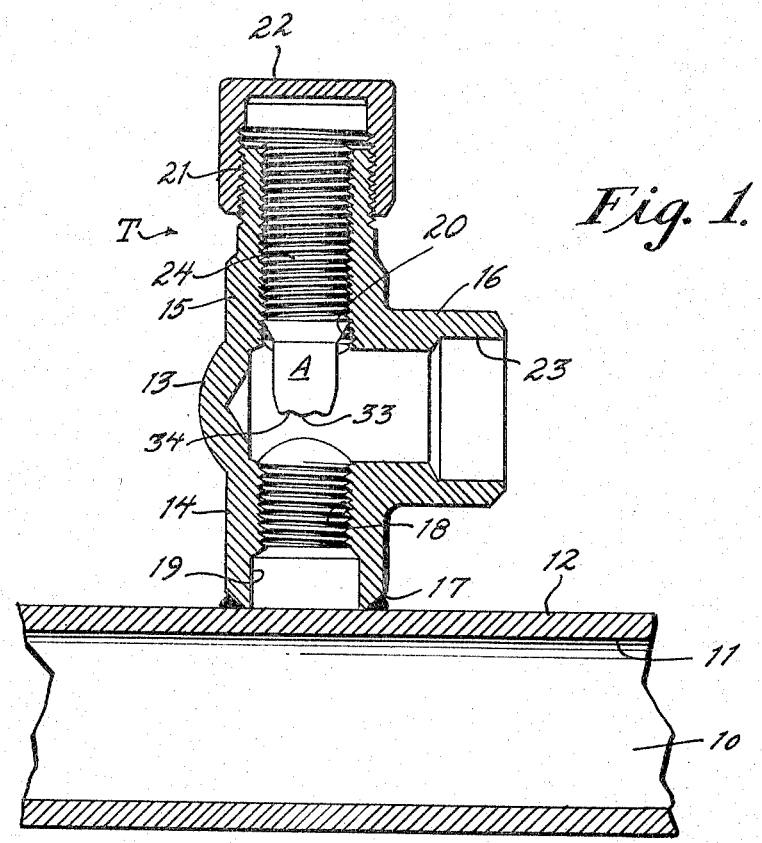
FIGURE 1 is a sectional view through a penetrating T that is made in accordance with the precepts of this invention.

Referring now to the drawings wherein like reference characters denote corresponding parts and first more particularly to FIGURE 1 a gas main is therein illustrated and represented by the reference character 10. In accordance with prevalent present day practice such mains are of steel. The main 10 has a bore 11 and an outer surface 12. A tapping T is referred to in its entirety by the reference character T and is shown as mounted on the outer surface 12 of the main 10.

The tapping T includes a main body portion 13 from which extends a lower extension 14 and an upper extension 15. Extending outwardly at one side from the main body portion 13 is a lateral extension 16 that is commonly known as a house outlet.

The T may be mounted on the main 10 in any appropriate manner. Present day practice indicates that welding is the more desirable method as it is effective with steel pipe. Thus, the lower extension 14 has a bevelled edge at 17 which facilitates establishing the welded joint.

The lower extension 14 is formed with a threaded bore at 18 and this bore is enlarged at 19 at the lower main engaging end. The upper portion 15 is also formed with a threaded bore 20 which is in alignment with the threaded bore 18 and of the same diameter. A penetrating tool which is referred to in its entirety by the reference character A is normally threadedly mounted in the bore 20 in the manner depicted in FIGURE 1. Moreover, the threads of the tool A are adapted for cooperation with the threaded bore 18 as the tool is moved downwardly in the main penetrating operation.

The upper extension 15 is exteriorly threaded at 21 and a cap 22 is screwed thereonto after the main has been tapped and the tool A retracted into the position of FIGURE 1.

The lateral extension 16 includes a socket at 23 for receiving a house connection in a well known manner.

Referring now more particularly to FIGURES 2–7 inclusive, the tool A is shown as comprising a main body portion 24. This main body portion 24 is exteriorly threaded as indicated at 25 and these threads at 25 cooperate with the bores 18 and 20 of the T body. At what might called the upper end of the body 24, the latter is formed with a hexagonal socket 26 which is provided for wrench engaging purposes. Thus, with the cap 22 removed, a wrench may be applied to the socket 26 and due to the threaded action cause the tool to move downwardly into main engaging and penetrating position.

Figure 5:
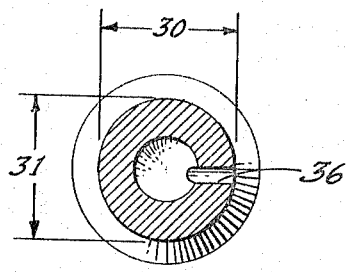
FIGURE 5 is a detailed section through the tool at the lubricating passage being taken about on the plane represented by line 5—5 of FIGURE 2.

At the end of the tool remote from the socket 26, there is an end portion 27 of reduced diameter with a conical shoulder 28 between this end portion 27 and the main body portion 24. The end portion 27 is formed with a socket 29 which in effect provides a tubular construction. However, the tube is not externally cylindrical but rather is of a non-circular shape on its outer surface being ovate on a cross section normal to the longitudinal axis of the tool with the shape being defined by the minor axis as indicated at 30 and a major axis at 31 as depicted in FIGURE 5.

The tubular end portion 29 has an outer tapered wall 32 that terminates at the free end in a cutting edge comprising four so-called raised waves 33 with a notch 34 having a curved bottom between each pair of adjacent waves. Four notches 34 are preferably located on the axis of the ellipse and define the ovate shape. At the closed end of the socket 29, there is a radial passage 36 which establishes communication between the socket and the exterior of the end portion 27. This passage 36 is located on the minor axis 30 of the ellipse and an essential requirement thereof is that it be spaced from the cutting edges.

Figure 8:
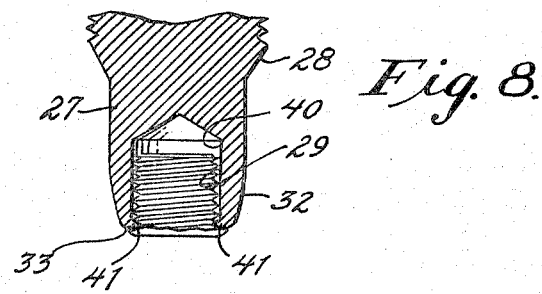
FIGURE 8 is a section through the penetrating end portion after the main has been penetrated and depicts how the slug is retained in the tool.

The tool A is made from an appropriate tool steel having required properties of yieldability whereby the tubular end portion 27 is rendered yieldable so that it will permanently deform during the cutting operation and acquire a set about the slug which is cut from the steel main 10 as shown in FIGURE 8.

It is also notable that the socket 29 is packed with an appropriate lubricant having a viscosity which causes it to remain in position in the socket. While this lubricant may be applied to the socket at any time, it will preferably be done at the site of manufacture.

Figure 2:
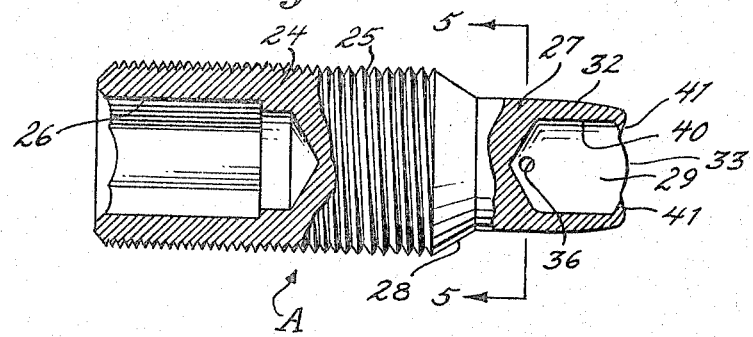
FIGURE 2 is a view taken on an enlarged scale partly in section and partly in elevation of the tool per se.
Figure 3:
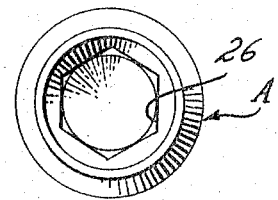
FIGURE 3 is a view taken in end elevation of the wrench engaging end of the tool.
Figure 4:
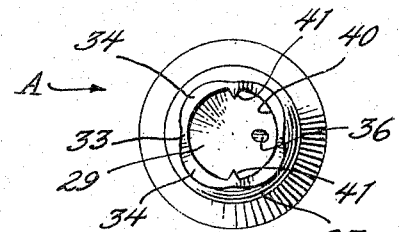
FIGURE 4 is a view in end elevation of the penetrating end of the tool.
Figure 6:
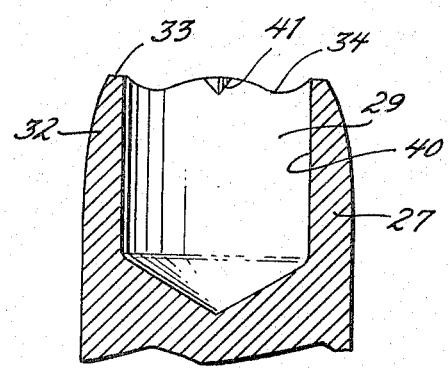
FIGURE 6 is a detailed longitudinal section through the penetrating end portion illustrating one of the notches which form the cutting edges.
Figure 7:
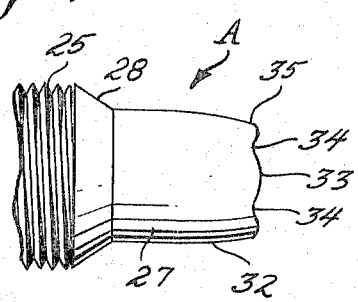
FIGURE 7 is a detailed elevation of the penetrating end depicting in particular, the formation of the cutting edges.

Upon referring to FIGURES 2 and 6, it will be noted that the tubular end portion 29 is defined by a bore or socket 40 that is formed with a pair of diametrically opposed thread cutting protuberances 41. While the threads formed by the protuberances 41 will generally have a pitch the same as the threads 25, it is believed that in actual practice so far as slug retention is concerned, the pitch of the threads formed by cutters 41 will gradually become less than that of the threads 25. Moreover, while the cutters 41 are shown as forming a single thread in the slug they could be longitudinally offset to form a pair of threads, or in fact, as many threads as there are cutters 41.

Operation

While the manner of using and mode of operation of the tapping T are believed to be obvious from the illustration of the drawings and description of parts given, they are briefly outlines as follows:

The T is mounted on the steel main 10 by a welded joint at 17 and the cap 22 removed. A wrench is now applied to the socket 26 and the tool A is rotated in a proper direction to advance it towards the main 10. As the tool A moves downwardly, the threads 25 engage with the threaded bore 18. As this advancing motion is continued, the cutting edges 33 engage the main 10 and cut thereinto. As this action takes place, the metal of the main is caused to flow and move laterally in contrast to an inward radial displacement. Moreover, as the cutting action is continued, the tapered wall of the tubular end portion 27 deforms and acquires a shape more closely approaching the circular.

During the initial stages of the cutting operation, lubricant will be extruded through the notches 34 and this lubricant reduces the friction caused by the cutting operation.

As the penetrating action continues, the notches 34 become closed. With the slug that is cut from the pipe being forced into the socket 29, lubricant therein is entrapped and creates a back pressure that resists the entry of the slug which is a piston-like action. However, this back pressure is relieved by the passage 36 through which the lubricant is extruded.

As the slug is cut, the thread cutters 41 on the tool end 29 form threads on the slug and the latter is actually screwed up into the bore 40. Due to this threaded engagement and the other features of the end portion 29, the slug is positively retained and will remain in the tool end as the tool is retracted. Thus, with the slug retained in the socket 29, the tool A may be retracted by rotating it in a reversed direction and the slug will be withdrawn through the formed aperture in the main.

The retraction of the tool is continued until it assumes the position of FIGURE 1 within the bore 20 leaving the house outlet open. In this position, the tool A functions as a valve or closure for the bore 20. The cap 22 is then restored to the position of FIGURE 1.

Figure 10:
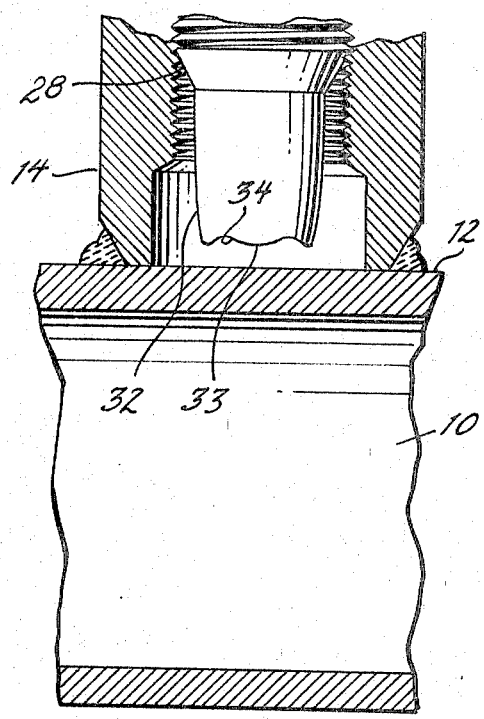
FIGURE 10 is a sectional view illustrating the lower end of the tool as it is about to engage the main.
Figure 11:
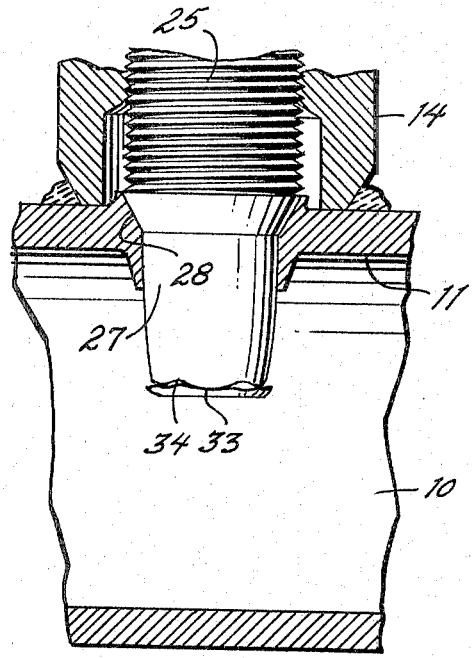
FIGURE 11 is a sectional view similar to FIGURE 10 showing the relation of the tool to the main after completion of the penetrating operation; and, FIGURE 12 is a sectional view of the main after removal of the tool.
Figure 12:
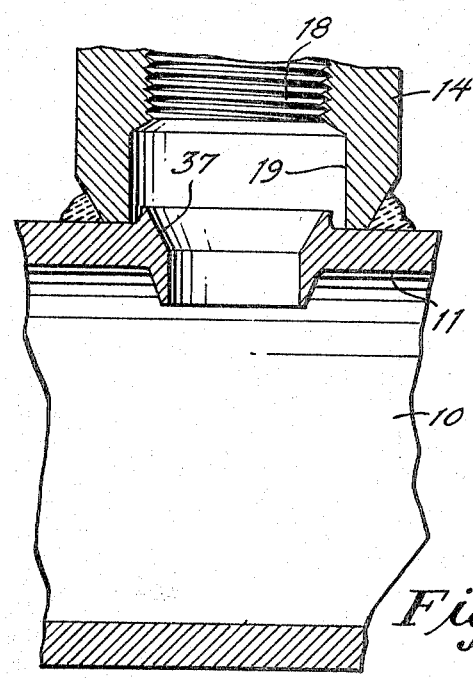
Figure 9:
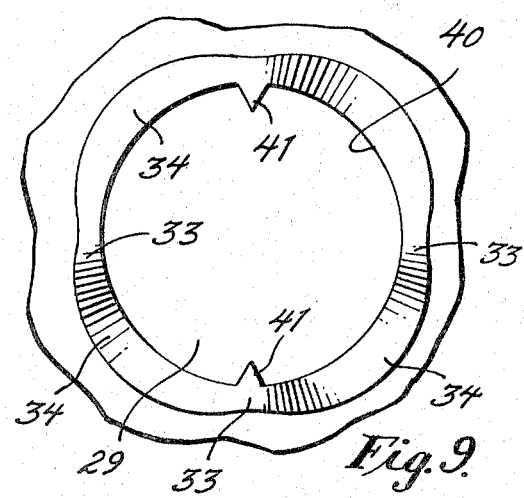
FIGURE 9 is a view in end elevation taken about on an enlarged scale, depicting the cutting edges.

Upon referring to FIGURES 10, 11, 12, it will be noted that a thin lip or membrane 37 is formed on the outside diameter of the main 19. This membrane 37 takes the shape of a truncated conic section. It is peculiarly adapted to cooperate with the conical shoulder 28 on the tool A in functioning as a valve seat. It is to be remembered that the end portion of the tool is often left in the formed hole for protracted periods and a good seal against the escape of gas is of prime importance.

With the membrane 37 present, only low torque in the tool is required to achieve a good seal.

While a preferred specification embodiment of the invention is hereinbefore set forth, it is to be clearly understood that the invention is not to be limited to the exact constructions, materials, and design illustrated and described because various modifications of these details may be provided in putting the invention into practice within the purview of the appended claims.

What is claimed is:

1. In a tapping T for pipe formed of extrudable material, comprising a body portion adapted to be secured to a pipe and having an internally threaded bore directed radially toward the pipe and a tapping tool having a threaded shaft portion screwed into said threaded bore, an outer end portion having a wrench-engaging means and a hollow inner end portion having a pipe wall penetrating edge and a bore extending into said tool from said edge, said tool being rotatable by said wrench-engaging means to screw said tool toward a pipe on which said body portion is secured to force said penetrating edge into the pipe wall to form a hole therein, whereby a portion of material of said wall is extruded into said bore to form a core, the improvement which consists in providing in said bore adjacent said penetrating edge at least one thread cutting projection of small circumferential extent projecting inwardly toward the axis of said bore to form in said core as it is extruded into said bore at least one thread having a pitch variable in accordance with the rate of extrusion of material into said bore, the interengagement of said at least one projection and thread acting to retain said core in said bore when said tool is withdrawn from said hole by rotation in the opposite direction.

2. A tapping T according to claim 1, in which two said thread cutting projections are provided at opposite sides of said bore.

3. A tapping T according to claim 1, in which said inner end portion of said tool is of non-circular external cross-sectional shape.

4. A tapping T according to claim 1, in which said inner end portion of said tool is of reduced diameter and is tapered.

5. A tapping T according to claim 1, in which said inner end portion of said tool is of tapered non-circular tubular shape.

6. A tapping T according to claim 5, in which said penetrating edge is defined by notches connected by raised curves.

7. A tapping T according to claim 6, in which two said thread cutting projections are located at opposite sides of said bore intermediate said notches.

References Cited by the Examiner
UNITED STATES PATENTS

| 1,020,302 | 3/1912 | Metz | 77—69 |
| 2,083,476 | 6/1937 | Rossin | 77—69 |
| 3,142,205 | 7/1964 | Hulslander | 77—38 |

FOREIGN PATENTS

| 837,399 | 6/1960 | Great Britain. |

FRANCIS S. HUSAR, *Primary Examiner.*